United States Patent
Okamoto

(10) Patent No.: US 7,109,673 B2
(45) Date of Patent: Sep. 19, 2006

(54) APPARATUS AND METHOD OF CONTROLLING MOTOR IN MANNER RESISTANT TO ADDITIVE NOISE DURING START UP OF MOTOR

(75) Inventor: Hisanori Okamoto, Owariasahi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/090,240

(22) Filed: Mar. 28, 2005

(65) Prior Publication Data

US 2005/0218845 A1 Oct. 6, 2005

(30) Foreign Application Priority Data

Mar. 30, 2004 (JP) ............................. 2004-098570

(51) Int. Cl.
*H02K 21/00* (2006.01)
(52) U.S. Cl. .................. 318/254; 308/138; 308/439; 308/701; 308/375
(58) Field of Classification Search .............. 318/254, 318/138, 439, 701, 375, 432, 433, 434; 358/342; 360/10.1
See application file for complete search history.

(56) References Cited

U.S. PATENT DOCUMENTS 4,858,030 A * 8/1989 Oku et al. .................... 386/71
2003/0022650 A1 * 1/2003 Tsuji et al. ................. 455/296

FOREIGN PATENT DOCUMENTS

| JP | A 09-247976 | 9/1997 |
| JP | A 10-35007 | 2/1998 |
| JP | A 2001-238482 | 8/2001 |

* cited by examiner

*Primary Examiner*—Karen Masih
(74) *Attorney, Agent, or Firm*—Oliff & Berridge, PLC

(57) ABSTRACT

An apparatus for controlling a rotational motion of a motor is disclosed which includes: a signal generator generating a rotational state signal indicative of a rotational state of the motor; and a controller producing a control signal for controlling the rotational motion of the motor, based on the rotational state signal generated by the signal generator, to thereby control the motor based on the produced control signal. The controller produces the control signal during a start up of the motor, such that the produced control signal is not affected by a noise component which is incorporated into the rotational state signal during the start up of the motor.

20 Claims, 9 Drawing Sheets

APPARATUS AND METHOD OF CONTROLLING MOTOR IN MANNER RESISTANT TO ADDITIVE NOISE DURING START UP OF MOTOR

This application is based on Japanese Patent Application No. 2004-098570 filed Mar. 30, 2004, the content of which is incorporated hereinto by reference.

CROSS-REFERENCE TO RATED APPLICATIONS

Not Applicable.

BACKGROUND OF THE INVENTION

1. Field of the Invention

The invention relates to a technique of controlling a rotational motion of a motor based on a signal indicative of the rotational state of the motor, and more particularly to a technique of controlling the motor in a manner resistant to an additive noise.

2. Description of the Related Art

Typically, various kinds of machines and apparatuses using motors need control of the respective motors. For fulfilling such a need, a technique has been widely practiced in which a rotational state signal is generated indicative of the rotational state of the motor, and in which the rotational motion of the motor is controlled based on the generated rotational state signal.

An example of such a machine is an image forming apparatus of an electrophotographic type such as a laser printer. The image forming apparatus is configured to include a polygon mirror for use in deflecting a laser beam exiting a semiconductor laser, a photosensitive drum on which an electrostatic latent image is formed with the laser beam exiting the polygon mirror, etc. These elements are each categorized into a movable element. Such a movable element requires a precise control of the rotational speed of the movable member. The image forming apparatus may include other elements each having the same requirement.

One example of a technique of controlling the rotational state of a motor has been commonly carried out, in which a frequency generator is employed to output a frequency signal indicative of the rotational speed of the motor, and in which the rotational motion of the motor is controlled through feedback control, based on the frequency signal outputted from the frequency generator.

BRIEF SUMMARY OF THE INVENTION

However, the possibility exists that the frequency signal fails to reflect the actual rotational state of the motor accurately during a start up of the motor. One of the reasons is that unexpected reverse rotations of the motor occur due to such as backlash in a motion transmission system of the motor.

A technique for use in an image forming apparatus is disclosed as one example of a conventional technique available in an environment where the above possibility exists, in which open-loop control is performed during an initial period of the operation of the motor, and in which the open-loop control is switched into closed-loop control after a predetermined time elapses from the preceding open-loop control.

However, an image forming apparatus, once being activated using the above conventional technique, is operated such that, during a start up of the motor, the open-loop control is performed for the motor by outputting thereto a control signal which has been produced as a result of a complete ignorance of information relating to the actual rotational state of the motor.

That is, the above conventional technique is established, in light of the possibility that the actual rotational state of the motor during its start up contains an additive noise, to prevent effects of the additive noise on the controlled rotational state of the motor during its start up.

When the above conventional technique is practiced, there is no monitoring the actual operating state of the motor during the open-loop control, resulting in incapability of detecting a possible abnormality in the motor operation during its start up due to some reason. In general, an abnormality in the motor operation during its start up may invite a drawback during the subsequent closed-loop control.

Despite of that, the above conventional technique performs the closed-loop control irrespective of whether or not the preceding start up of the motor was normally experienced. For this reason, an abnormality in the rotational state of the motor during its start up may possibly prevent an expected entry of the motor control into the closed-loop control.

Further, the above conventional technique requires a shifting of the control manner of the motor between the open-loop and the closed-loop control over a continuous period of operation of the motor, resulting in increase in structural complexity and manufacturing cost.

It is therefore an object of the present invention to provide a technique of controlling the rotational state of a motor based on a rotational state signal indicative of the rotational state of the motor, in an expected condition, despite of the generation of a noise in the rotational state signal during a start up of the motor.

According to the present invention, an apparatus for controlling a rotational motion of a motor is provided, comprising:

a signal generator generating a rotational state signal indicative of a rotational state of the motor; and a controller producing a control signal for controlling the rotational motion of the motor, based on the rotational state signal generated by the signal generator, to thereby control the motor based on the produced control signal, wherein the controller produces the control signal during a start up of the motor, such that the produced control signal is not affected by a noise component which is incorporated into the rotational state signal during the start up of the motor.

It is possible to predict to a certain degree of accuracy the characteristics (e.g., frequency) of a noise which is incorporated into a rotational state signal indicative of the rotational state of the motor during its start up. In view of this, a noise component generated during the start up of the motor can be reduced in level in the rotational state signal of the motor.

Based on the above findings, the apparatus according to the present invention allows the production of the control signal so as to avoid an adverse effect on the resulted control signal, of the noise component which has been introduced into the rotational state signal during the start up of the motor.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities show. In the drawings.

DETAILED DESCRIPTION OF THE INVENTION

Figure 1:
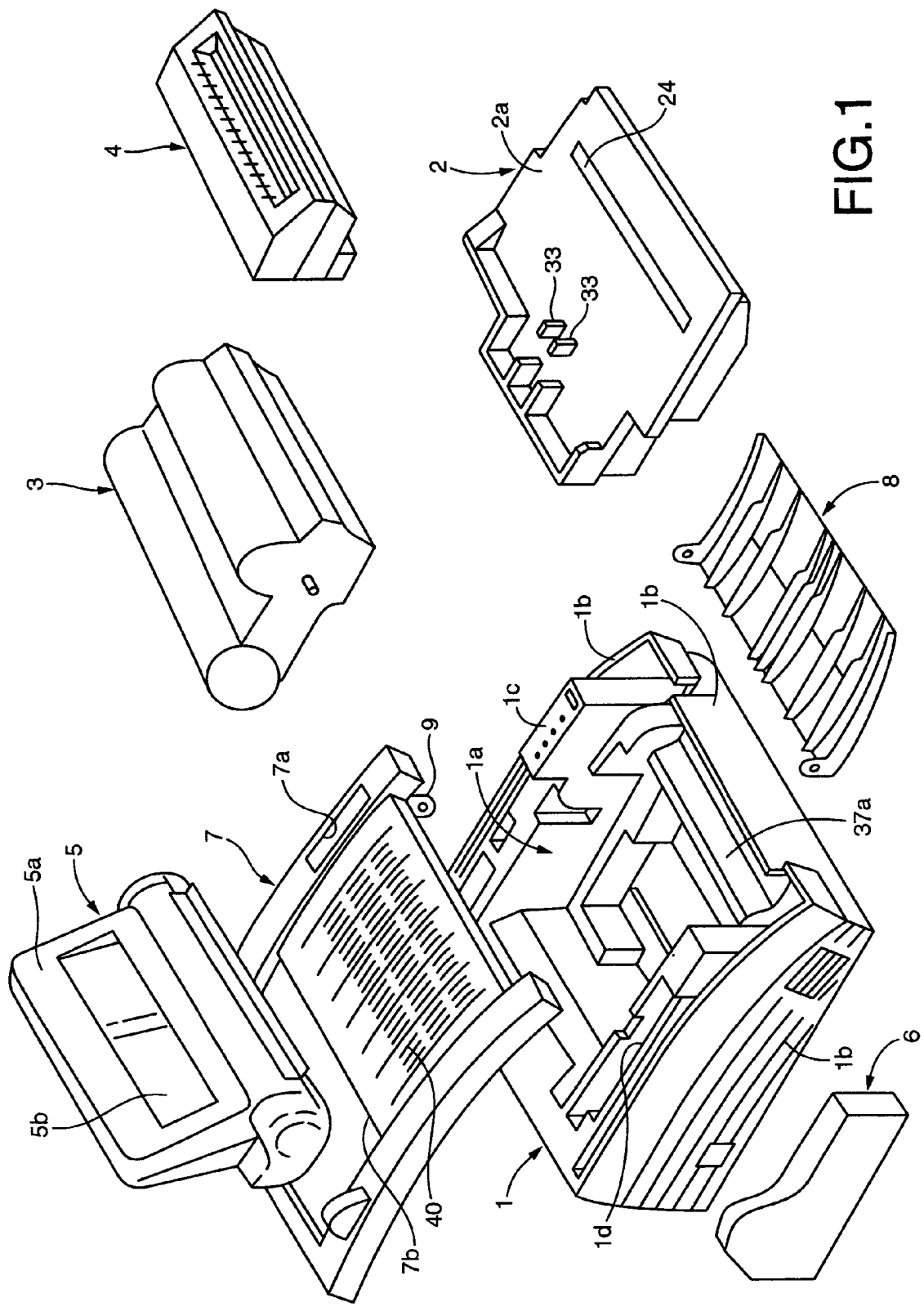
FIG. 1 is a perspective and exploded view illustrating a laser printer as an image forming apparatus according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An apparatus for controlling a rotational motion of a motor, comprising:

a signal generator generating a rotational state signal indicative of a rotational state of the motor; and a controller producing a control signal for controlling the rotational motion of the motor, based on the rotational state signal generated by the signal generator, to thereby control the motor based on the produced control signal, wherein the controller produces the control signal during a start up of the motor, such that the produced control signal is not affected by a noise component which is incorporated into the rotational state signal during the start up of the motor.

As described above, it is possible to predict to a certain degree of accuracy the characteristics (e.g., frequency) of a noise which is incorporated into a rotational state signal indicative of the rotational state of the motor during its start up. In view of this, a noise component generated during the start up of the motor can be reduced in level in the rotational state signal of the motor.

Based on the above findings, the apparatus according to the above mode (1) allows the production of the control signal so as to avoid an adverse effect on the resulted control signal, of the noise component which has been introduced into the rotational state signal during the start up of the motor.

(2) The apparatus according to mode (1), wherein the controller produces the control signal for controlling the rotational motion of the motor through feedback control based on the generated rotational state signal, irrespective of whether or not the start up of the motor is being experienced.

The apparatus according to the above mode (2) allows the feedback control of the rotational motion of the motor using the rotational state signal irrespective of whether or not the start up of the motor is being experienced.

The apparatus according to the above mode (2) therefore does not require a shifting of the control manner of the motor from open-loop control to closed-loop control, resulting in avoidance of an inappropriate closed-loop control after and due to an inadequate start up operation of the motor resulting from the precedent open-loop control.

(3) The apparatus according to mode (1) or (2), wherein the controller comprises: a noise reducer reducing a level of the noise component in the rotational state signal generated by the signal generator; and a control-signal producing device producing the control signal based on the rotational state signal in which the noise component has been reduced by the noise reducer.

The apparatus according to the above mode (3) allows the control of the motor during its start up by a noise reduction of a noise component which is predicted to be generated during the start up of the motor, wherein the noise reduction is performed in the rotational state signal, i.e., information relating to the rotational state of the motor.

The apparatus according to the above mode (3) therefore allows a more appropriate control of the rotational state of the motor using the detected rotational state signal of the motor during its start up, despite that the detected rotational state signal is originally possible to contain a noise component during the start up of the motor.

As a result, the apparatus according to the above mode (3) permits the prevention of entry of the motor control into closed-loop control, i.e., feedback control at the time that the rotational motion of the motor is not yet adequately controlled.

(4) The apparatus according to mode (3), wherein the noise reducer reduces the level of the noise component in the rotational state signal, prior to the production of the control signal based on the rotational state signal.

(5) The apparatus according to mode (3) or (4), wherein the noise reducer is configured such that a noise component to be reduced in level in the rotational state signal is varied in characteristics depending on a set value, and wherein the set value is varied to be different between during and after the start up of the motor.

The apparatus according to the above mode (5) allows the temporal variation in characteristics (e.g., frequency) of a noise component which is to be reduced by the noise reducer, contributing to an optimized noise reduction not only during the start up operation of the motor but also during the regular operation of the motor.

In the apparatus according to the above mode (5), the temporal variation in characteristics of the noise component is achieved by the temporal modification of a set value of the noise reducer.

According to one of applications of the set value, the rotational state signal is converted into a binary signal, and then whether the binary signal is at high level or low level is determined. If the binary signal is at high level, the count value of a counter is incremented each cycle of a reference clock, while, if the binary signal is at low level, the count value is decremented each cycle of the reference clock.

In the above application of the set value, until the count value reaches the set value, the noise reducer holds the level of its output signal despite of a change or transition in level of its input signal. If the count value reaches the set value, the noise reducer allows a change or transition in level of the output signal in response to a change or transition in level of the input signal.

Although the above application of the set value employs the noise reducer in the form of the counter, the noise reducer in the above mode (5) may be modified to a customary digital filter such as a digital filter of an FIR type or an IIR type. In this modification, it may be considered that a filter coefficient or factor of the applied digital filter corresponds to one example of the set value set forth in the above mode (5).

In practicing the apparatus according to the above mode (5), the set value may be defined so as to change at a time that a predetermined length of time is elapsed, a time that the rotational speed of the motor represented by the rotational state signal exceeds a predetermined speed, or the like.

(6) The apparatus according to mode (5), wherein the set value is established in magnitude to allow the noise reducer not to reduce in level a frequency component of the rotational state signal which reflects a true component of compound rotational motion of the motor during the start up of the motor.

The apparatus according to the above mode (6) allows the noise reducer to pass a true component of the compound rotational motion of the motor, wherein the true component reflects a normal operation of the motor during its start up.

The rotational speed of the motor is lower during the start up operation than that during the regular operation of the motor following the start up operation. As a result, in the case where the rotational state signal is in the form of the aforementioned frequency signal, the frequency of the true component of the rotational state signal is lower during the start up operation than that during the regular operation.

With this in mind, the apparatus according to the above mode (6) may be practiced such that, during the start up of the motor, the noise reducer reduces a high frequency component (i.e., noise component) of the rotational state signal, while passing a low frequency component (i.e., true component) of the rotational state signal, allowing an appropriate detection of the rotational state of the motor during its start up.

(7) The apparatus according to any one of modes (3)–(6), wherein the noise reducer comprises an amplifier amplifying the rotational state signal, wherein the amplifier is configured to become substantially inoperative during the start up of the motor.

The apparatus according to the above mode (7) allows the noise reduction using an amplifier variable in operation state. In practicing the apparatus, the noise reducer may be constructed to additionally include a filter performing noise reduction depending on the set value as described above.

(8) The apparatus according to any one of modes (3)–(6), wherein the noise reducer comprises an amplifier amplifying the rotational state signal by a variable amplification factor, wherein the amplification factor is established to become smaller during the start up of the motor, and become larger during a steady motion of the motor.

The apparatus according to the above mode (8) allows the noise reduction using an amplifier variable in amplification factor. The amplification factor is varied so as to be smaller during the start up of the motor, and larger during a steady or regular motion of the motor.

According to an example of the apparatus according to the above mode (8), the amplification factor may be varied depending on the amplitude of the rotational state signal, such that the amplification factor becomes smaller with the amplitude being smaller, and larger with the amplitude being larger. Such an amplifier employed in the example may be an antilogarithmic amplifier.

The apparatus according to the above mode (8) may be practiced in an arrangement where a three-phase brushless motor may be employed as the motor, a frequency generator may be employed as the signal generator, and additionally, a frequency signal of the frequency generator operable using magnetic patterns (FG patterns) on the outer circumferential peripheral of a rotor of the three-phase brushless motor may be employed as the rotational state signal.

In this arrangement, the amplitude of the frequency signal is larger with the rotational speed of the motor being lower, while is smaller with the rotational speed is higher. This arrangement provides a preferable situation where the above example of the apparatus according to the above mode (8) is available.

In consideration of the possibility that the rotational state signal is amplified prior to entry into the noise reducer, the term "rotational state signal" to be directly processed by the noise reducer set forth in any one of modes (2) to (7) may be interpreted to mean the same signal as the raw rotational-state-signal (e.g., a frequency signal) generated by the signal generator, or to mean the signal obtained by modifying or amplifying the raw rotational-state-signal generated by the signal generator.

(9) The apparatus according to mode (8), wherein the amplifier is an antilogarithmic amplifier.

(10) The apparatus according to any one of modes (1)–(9), wherein the signal generator comprises a frequency generator outputs the rotational state signal in the form of a frequency signal which is an analog signal varied in frequency depending upon the rotational state of the motor.

(11) The apparatus according to mode (10), wherein the frequency signal is varied in frequency depending upon a rotational speed of the motor.

(12) The apparatus according to mode (10) or (11), wherein the controller comprises a noise reducing device reducing in level the noise component in a signal obtained by amplifying the frequency signal generated by the frequency generator.

(13) The apparatus according to any one of modes (1)–(12), wherein the motor comprises a scanner motor rotating a polygon mirror for use in scanning a light beam cyclically, wherein the signal generator comprises a beam detector disposed stationary at a predetermined position allowing the light beam enters the beam detector intermittently per each cycle of scanning of the light beam, the beam detector outputting a detector signal varied in level depending on whether or not the beam detector receives the light beam, and wherein the rotational state signal is the detector signal outputted from the beam detector.

The apparatus according to the above mode (13) may be practiced in various manners. For example, the apparatus may be practiced in a manner that the scanner motor deflects a laser beam emitted from a semiconductor laser as a light source. The apparatus may be practice such that the controller performs the noise reduction of the same as the raw detector-signal generated by the beam detector, or of the signal obtained by modifying or amplifying the raw detector-signal generated by the beam detector. The apparatus may be practiced such that the beam detector is for use in control of scanning operation for exposure of a photoconductor (e.g., a photosensitive drum, a photosensitive belt, etc.).

(14) The apparatus according to mode (13), wherein the polygon mirror deflects the light beam cyclically to scan a photoconductor.

(15) The apparatus according to mode (13) or (14), wherein the controller comprises:

a signal processor processing the detector signal outputted from the beam detector:

a noise reducing device reducing the noise component in the detector signal processed by the signal processor; and a control-signal producing device producing the control signal based on the detector signal in which the noise component has been reduced by the noise reducing device, wherein the signal processor processes unprocessed detector signal into processed detector signal in a manner that, in a steady state of the unprocessed detector signal, the processed detector signal indicates whether the unprocessed detector signal is a non-light-reception signal indicating that the beam detector does not receive the light beam, or a light-reception signal indicating that the beam detector receives the light beam, and wherein the signal processor processes the unprocessed detector signal into the processed detector signal in a manner that, in an oscillating state in which the unprocessed detector signal is oscillated in level so as to alternately repeat a forward transition of the unprocessed detector signal from the non-light-reception signal to the light-reception signal, and a reverse transition from the light-reception signal to the non-light-reception signal, the processed detector signal steadily indicates the forward transition, without indicating the reverse transition, during a predetermined length of time elapsed from a start time of the forward transition.

In the apparatus according to the above mode (15), the beam detector outputs an on-state signal as an example of a light-reception signal indicating that the beam detector received the light beam. The light beam does not resident at the beam detector, but momentarily passes through the beam detector, resulting in the beam detector outputting the on-state signal only for a very short time.

In view of the above, the apparatus according to the above mode (15) performs a particular signal processing for the output signal of the beam detector, for decreasing the sensitivity of the input signal of the noise reducing device to the output signal of the beam detector. This is conducive to a more ensured operation of the noise reducing device.

(16) An apparatus for forming an image, comprising;

an image forming device forming an image on an image receiver medium;

a feeding device feeding the image receiver medium to the image forming device;

at least one motor for use in at least one of the image forming device and the feeding device; and a driving device driving the at least one motor for rotation thereof, wherein the driving device comprises the apparatus according to any one of modes (1)–(15) for use in controlling at least one of the at least one motor.

The apparatus according to the above mode (16) improves the controlled state of at least one motor, eventually resulting in an improved performance in forming an image, for example.

(17) A method of controlling a rotational motion of a motor, comprising the steps of:

generating a rotational state signal indicative of a rotational state of the motor;

reducing within the generated rotational state signal a level of a noise component which is incorporated into the rotational state signal during a start up of the motor;

producing a control signal for controlling the rotational motion of the motor through feedback control, based on the rotational state signal in which the noise component has been reduced in level, irrespective of whether or not the start up of the motor is being experienced; and controlling the motor based on the produced control signal.

The method according to the above mode (17) provides basically the same functions and effects as those of the apparatus according to the above mode (1), according to basically the same principle as that of the apparatus.

Several presently preferred embodiments of the invention will be described in more detail by reference to the drawings in which like numerals are used to indicate like elements throughout.

Figure 2:
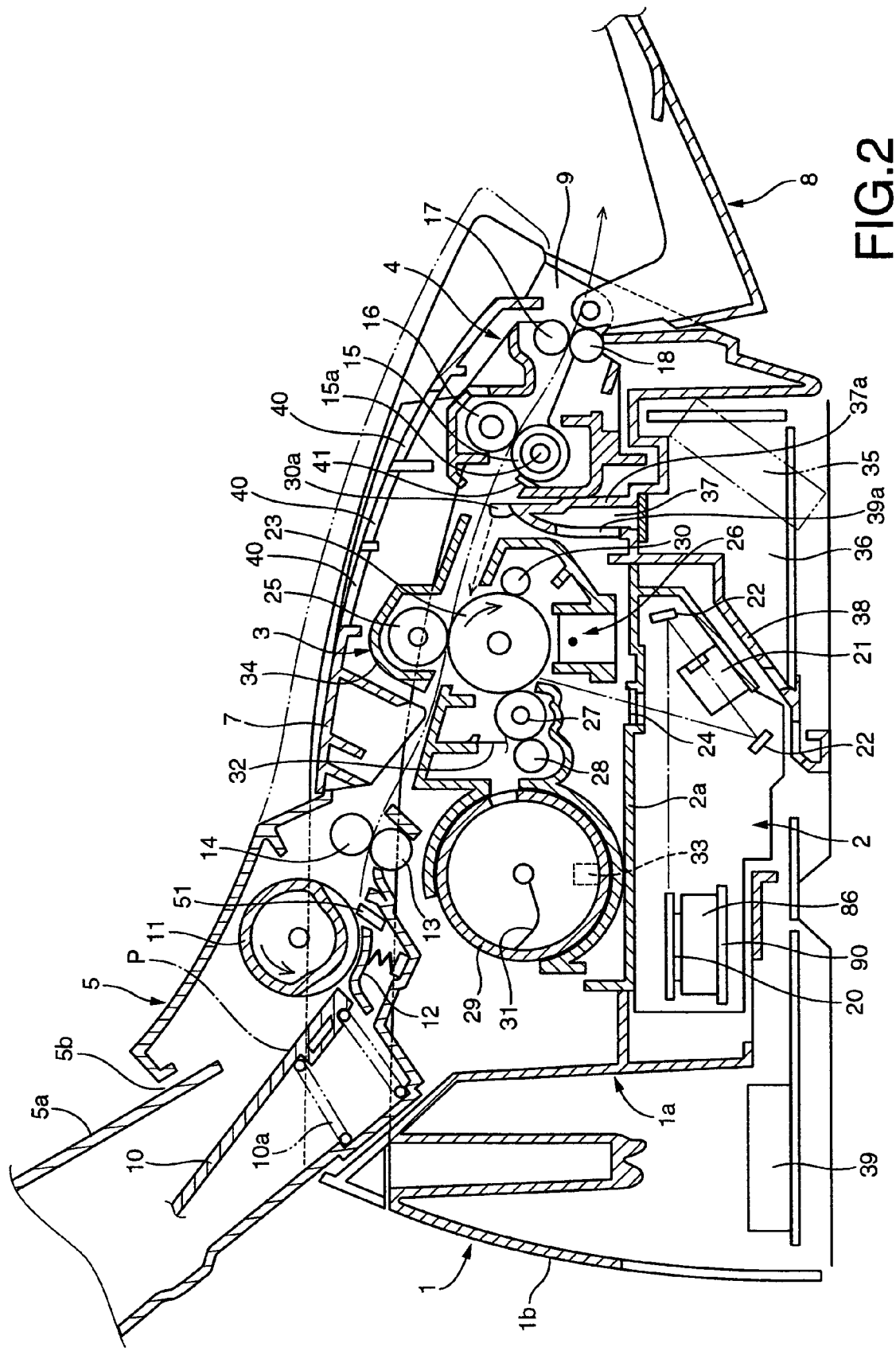
FIG. 2 is a sectional side view illustrating the laser printer shown in FIG. 1.

FIG. 1 shows in perspective view a laser printer as an image forming apparatus including a motor control device in accordance with a first embodiment of the present invention. FIG. 2 shows the laser printer in sectional side view.

As shown in FIG. 1, the laser printer includes a body case 1 made of synthetic resin. The body case 1 has a main frame 1a and a main cover 1b which covers externally the main frame 1a on all sides. The main frame 1a and the main cover 1b are integrally formed using a method such as an injection molding.

The main frame 1a includes: a front side portion (on the near side of FIG. 1); a rear side portion (on the far side of FIG. 1); a left side portion (on the right-hand side of FIG. 1); and a right side portion (on the left-hand side of FIG. 1). The main frame 1a further includes an inner space surrounded by the front, rear, left, and right side portions.

As shown in FIG. 1, an operation panel 1c is disposed at the main frame 1a. More specifically, the operation panel 1c is disposed on the upper surface of a projection extending upwardly from the upper surface of the left side portion of the main frame 1a.

As shown in FIG. 2, on the main frame 1a of the body case 1, there are mounted a scanner unit 2 as an exposure device; a process unit 3 as an image forming device; a fuser unit 4; a feeder unit 5; a drive train unit 6 (see FIG. 1); etc.

Figure 3:
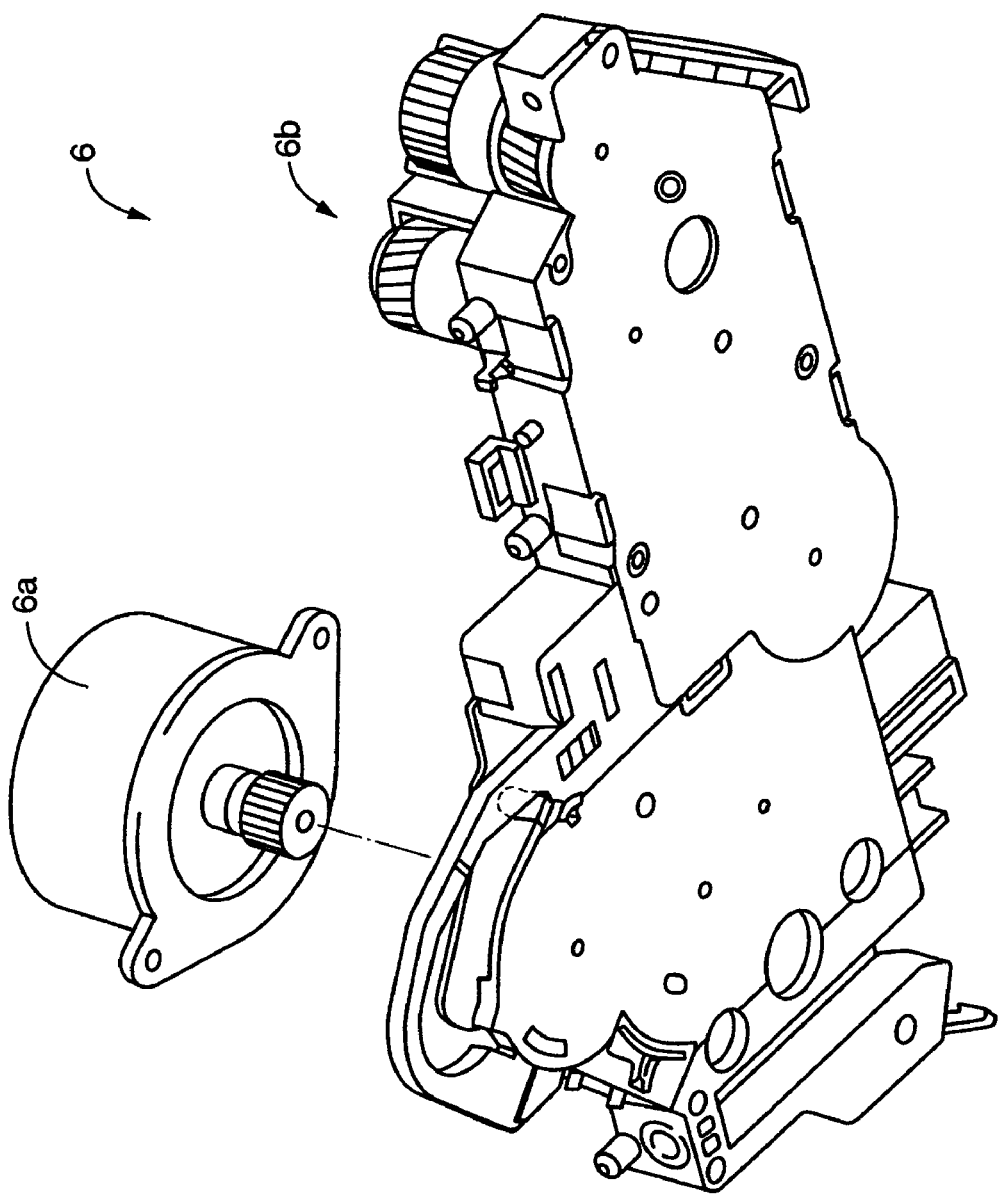
FIG. 3 is a perspective view illustrating a drive train unit shown in FIG. 1.

In the present embodiment, as shown in FIG. 3, the drive train unit 6 is constructed so as to include a main motor 6a and a gear train 6b. The constructions equivalent or similar to those of the main motor 6a and the gear train 6b are disclosed in U.S. Pat. No. 6,205,302, the content of which is incorporated hereinto by reference. The main motor 6a is in the form of a three-phase brushless DC motor controlled by the motor control device described later in more detail.

As shown in FIG. 1, a storage recess 1d is formed between an inner surface of the right side portion of the main cover 1b shown in FIG. 1 and an outer surface of the right side portion of the main frame 1a in proximity to each other. The storage recess 1d accommodates the drive train unit 6 therein. The drive train unit 6 is inserted from under the main case 1 for attachment and fixing thereto.

As shown in FIG. 1, the laser printer further includes a top cover 7 as a body cover made of synthetic resin, which covers the upper surfaces of the main frame 1a and the main cover 1b. At the top cover 7, through holes 7a and 7b are formed. The through hole 7a is formed to allow the aforementioned projection of the main frame 1a to upwardly penetrate the top cover 7, whereby the operation panel 1c is exposed to over the upper surface of the top cover 7. On the other hand, the through hole 7b is formed to allow a base portion of the feeder unit 5 to penetrate the top cover 7.

As shown in FIGS. 1–2, the laser printer further includes an exit tray 8. The exit tray 8 is mounted at its base end portion on a pair of supports 9, 9 (only one of which is shown in FIG. 1) so that the exit tray 8 may be pivotable in a general vertical direction. The supports 9, 9 are formed on a front portion of the top cover 7 at both lateral ends thereof, respectively. When not in use, the exit tray 8 can be folded back onto and cover the upper surface of the top cover 7.

As shown in FIGS. 1–2, the feeder unit 5 has a feeder case 5a, a support plate 10, and a feeder roller 11. Into the feeder case 5a, a stack of individual recording sheets P as receiving media located one against another is loaded. The feeder unit 5 further has a spring 10a within the feeder case 5a which biases the support plate 10 toward the feeder roller 11. As is evident from FIG. 2, a leading edge portion of a recording sheet P is pressed toward the feeder roller 11 via the support plate 10. The feeder roller 11 is rotated because of a driving force transmitted from the drive train unit 6.

As shown in FIG. 2, the feeder unit 5 further includes a separation pad 12, and a pair of registration rollers 13 and 14 opposing to each other. Because of coaction of the feeder roller 11 and the separation pad 12, the recording sheets P, upon separated from one another one by one, are delivered to between the registration rollers 13 and 14.

The feeder unit 5 further includes a sheet inlet 5b for a manual feed of a recording sheet P. The sheet inlet 5b allows the user who wishes to print a selected recording sheet P different in type from the recording sheets P previously set within the feeder case 5a, to insert the selected recording sheet P into the feeder unit 5 via the sheet inlet 5b.

The process unit 3, in operation, attaches a toner as a developer material to the surface of the recording sheet P which is fed into the process unit 3 by means of the registration rollers 13 and 14, resulting in formation of a toner image on the recording sheet P.

The fuser unit 4 includes a heat roller 15 and a pressure roller 16 opposing to each other. The fuser unit 4, in operation, heats the recording sheet P on which the toner image has been formed, with the recording sheet P being in contact with the heat roller 15 and the pressure roller 16 therebetween, resulting in fixing of the toner image onto the recording sheet P.

The heat roller 15 is constructed to include a fuser heater 15a within an aluminum pipe whose surface is coated with fluorine. A thermistor 25 as a temperature sensor is disposed in contact with the outer surface of the heat roller 15 at an approximately axially center position thereof. The pressure roller 16 is in the form of a rubber roller whose surface is coated with fluororesin.

As shown in FIG. 2, the fuser unit 4 further includes within its case an exit roller 17 and a pinch roller 18 both of which are disposed on a downstream side of a travel path of the recording sheet P. The exit roller 17 and the pinch roller 18 cooperate to constitute a sheet ejector of the fuser unit 4. The sheet ejector ejects the recording sheet P onto which the toner image has been fused, to the exit tray 8 In the present embodiment, a path extending from the feeder roller 11 to the sheet ejector is the travel path of the receiving media (illustrated in dash-dot-dot lines in FIG. 2).

As shown in FIGS. 1–2, the process unit 3 is disposed in the main frame 1a at an approximately center position thereof. As shown in FIG. 2, the scanner unit 2 is disposed under the process unit 3. The scanner unit 2 is fixed at its upper support plate 2a, using suitable fixtures such as screws not shown, to a stay portion which is formed integrally with and on the upper surface of the bottom plate of the main frame 1a.

As shown in FIG. 2, the scanner unit 2 as an exposure device is composed of a laser emitter not shown; a polygon mirror 20; a lens 21; reflective mirrors 22, 22; etc., all of which are disposed within the scanner unit 2 under its upper support plate 2a made of synthetic resin. The polygon mirror 20 is driven for rotation at a higher speed by a scanner motor 86 in the form of a three-phase brushless DC motor. The scanner motor 86 is driven by a motor drive circuit 90 including the motor control device described later in more detail.

The polygon mirror 20 reflects a laser beam emitted from the aforementioned laser emitter, and also deflects the laser beam to angularly oscillate it. The deflected laser beam passes one of the reflective mirrors 22, 22, the lens 21, and the other of the reflective mirrors 22, 22, sequentially in the description order.

As shown in FIG. 2, the laser beam then enters a glass plate 24 which covers an elongate slot formed through the upper support plate 2a. The slot is formed in the upper support plate 2a so as to extend parallel to the axis of a photoconductive or photosensitive drum 23 as a photoconductor of the process unit 3. The laser beam, upon passing through the glass plate 24, enters the surface of the photosensitive drum 23. The surface of the photosensitive drum 23 is cyclically scanned with the laser beam, resulting in exposure of the photosensitive drum 23 to the laser beam.

As shown in FIG. 2, the process unit 3, as described above, includes the photosensitive drum 23. In the process unit 3, a transfer roller 25 is disposed in abutment against the upper surface of the photosensitive drum 23. Under the photosensitive drum 23, a charger 26 (which is of a Scorotron-type, for example) is additionally disposed.

The process unit 3 further includes: a developer having a developer roller 27 and a supply roller 28 both of which are disposed upstream from the photosensitive drum 23 in the feeding direction of the recording sheet P; and a toner supply portion, that is to say, a removable toner cartridge 29 disposed upstream from the developer. The process unit 3 yet further includes: a cleaning roller 30 disposed downstream from the photosensitive drum 23; a discharge lump 30a disposed downstream from the cleaning roller 30; etc.

The uniform charge of the surface of the photosensitive drum 23 by the charger 26 forms a photosensitive layer on the surface of the photosensitive drum 23. The photosensitive layer is scanned with the laser beam exiting from the scanner unit 2, resulting in formation of an electrostatic latent image on the photosensitive layer. A toner within the toner cartridge 29, upon agitated with an agitator 31, exits from the toner cartridge 29, and then is carried on the surface of the developer roller 27 via the supply roller 2B to form a toner layer. The toner layer carried on the surface of the developer roller 27 is regulated in thickness by a blade 32.

The electrostatic latent image formed on the surface of the photosensitive drum 23 is visualized as a toner image, as a result of the developer roller 27 attaching toner to the electrostatic latent image. The toner image, upon formed on the photosensitive drum 23 as a result of the toner attachment, is transferred onto the recording sheet P during a passing of the recording sheet P between the photosensitive drum 23 and the transfer roller 25 to which a transfer bias opposite in potential to that of the photosensitive drum 23 has been applied. Upon transfer, a toner remaining on the surface of the photosensitive drum 23 is temporarily collected by the cleaning roller 30 to return to the photosensitive drum 23 at a predetermined time, and is then collected into the process unit 3 by the developer roller 27.

A toner sensor 33 is disposed at the upper support plate 2a of the scanner unit 2 so as to project upwardly therefrom. The toner sensor 33 is configured to include a light emitter and a light receiver, although are not shown, which coact to detect optically whether or not a toner is resident in the toner cartridge 29. The toner sensor 33 is disposed to face a recess, as not shown, formed on the lower surface portion of the toner cartridge 29 in the process unit 3.

The process unit 3 is in the form of a cartridge allowing the components of the process unit 3 to be contained within the case 34 made of synthetic resin. The thus-cartridged process unit 3 is removably mounted on the main frame 1a.

As shown in FIG. 2, in the laser printer, a storage portion 36 is formed in an area in which a front portion of the main frame 1a (the right-hand portion of the main frame 1a in FIG. 2) and a front portion of the main cover 1b (the right-hand portion of the main cover 1b in FIG. 2) are connected with each other. The storage portion 36 is located under a bottom portion of the main frame 1a. Within the storage portion 36, a cooling fan 35 is accommodated.

As shown in FIG. 2, an air duct 37 communicating with a space within the storage portion 36 is formed so as to extend in the lateral direction of the laser printer. The lateral direction is parallel to the widthwise of a recording sheet P traveled along the aforementioned travel path, and perpendicular to the sheet of FIG. 2. As shown in FIGS. 1–2, the air duct 37 includes a member 37a extending in the lateral direction of the laser printer with its inverted-V shaped section. The member 37a is positioned between the process unit 3 and the fuser unit 4 so as to thermally isolate the heat roller 15 from the process unit 3, with the result that heat generated by the heat roller 15 of the fuser unit 4 is prevented from being conducted or transmitted directly to the process unit 3.

As shown in FIG. 2, a position of a cooling air flow generated by the cooling fan 35 flows along a lower surface of a bottom plate portion 38 of the main frame 1a into the rear portion of the laser printer, thereby cooling a power source 39 and the main motor 6a within the drive train unit 6 both of which are disposed at the rear portion of the laser printer.

As shown in FIG. 2, another portion of the cooling air flow generated by the cooling fan 35 flows via the air duct 37 from the right-hand front portion of the laser printer at which the cooling fan 35 is disposed, to the left-hand front portion of the laser printer. The another portion of the cooling air flow subsequently flows into the rear portion of the laser printer via an inner space extending from the right-hand front portion to the right-hand rear portion of the laser printer. The cooling air flow functions to reduce rise in temperature of the member 37a over the entire length thereof.

As shown in FIG. 2, still another portion of the cooling air flow generated by the cooling fan 35 blows out through a plurality of slits 39a of the member 37a open to the process unit 3. The still another portion of the cooling air flow rises up so as to pass through between the process unit 3 and the fuser unit 4. Eventually, the still another portion of the cooling air flow exits from the laser printer via a plurality of air outlets 40 (see FIG. 1) formed in the top cover 7.

Figure 4:
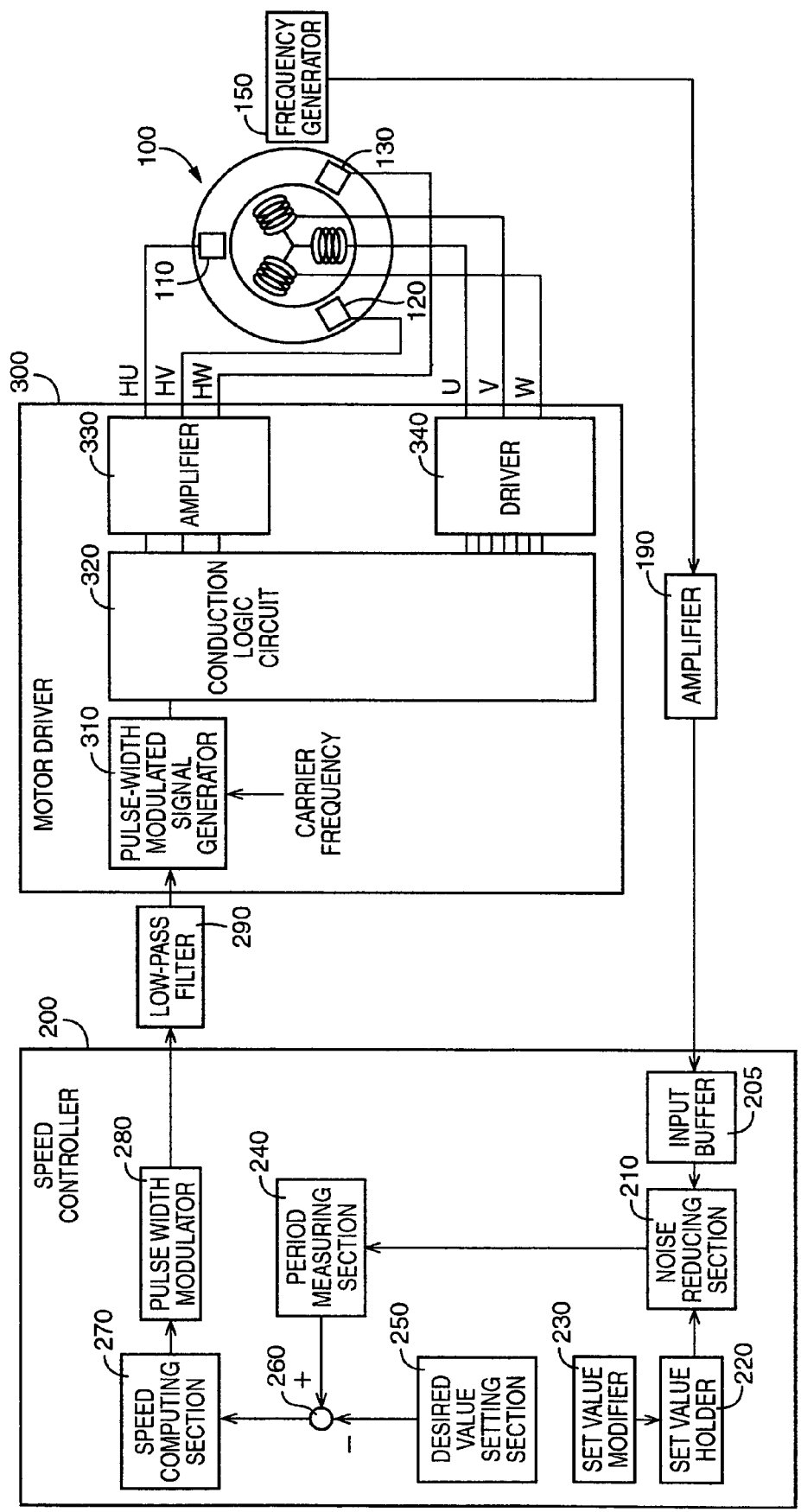
FIG. 4 is a schematic view illustrating a motor control device in the laser printer shown in FIG. 1.

The constructions equivalent or similar to those for avoiding rise in temperature of the laser printer are disclosed in U.S. Pat. No. 6,205,302, the content of which is incorporated hereinto by reference FIG. 4 shows the motor control device of the laser printer. In the present embodiment, although the motor control device is employed for the drive control of at least one of the main motor 6a and the scanner motor 86, the motor control device may of course be employed for the drive control of other motors of the laser printer.

The main motor 6a and the scanner motor 86 are each in the form of a three-phase brushless DC motor. The main motor 6a and the scanner motor 86 are also common to each other in that they are motors controlled by the motor control device. In view of this, they will be collectively referred to as "motor 100."

The motor control device is configured so as to include: a frequency generator (hereinafter, referred to simply as "FG") 150: an amplifier 190; a speed controller 200; a low-pass filter (hereinafter, referred to simply as "LPF") 290; and a motor driver 300.

The FG 150, provided for the motor 100, outputs as a frequency signal an analog signal varied in frequency depending on the rotational speed of the motor 100. The frequency signal outputted from the FG 150 is amplified by the amplifier 190. The amplifier 190 amplifies the frequency signal received from the FG 150 by an extremely large amplification factor, to thereby obtain a signal approximate to a binary signal to be obtained by a literal thresholding operation of the raw frequency signal.

The speed controller 200 in the form of an Application-Specific Integrated Circuit (ASIC) includes: an input buffer 205; a noise reducing section 210; a set value holder 220; and a set value modifier 230.

The input buffer 205, once receiving the output signal of the amplifier 190, amplifies the output signal by an extremely large amplification factor. As a result of the amplification, the output signal of the amplifier 190, as described later with reference to FIG. 5, is processed to become a binary signal.

The input buffer 205 is provided as a CMOS buffer, for example. In operation, the input buffer 205 outputs a signal at low level if the input signal of the input buffer 205 is not higher than an lower threshold value, while outputs a signal at high level if the input signal of the input buffer 205 is not lower than an upper threshold value.

Figure 5:
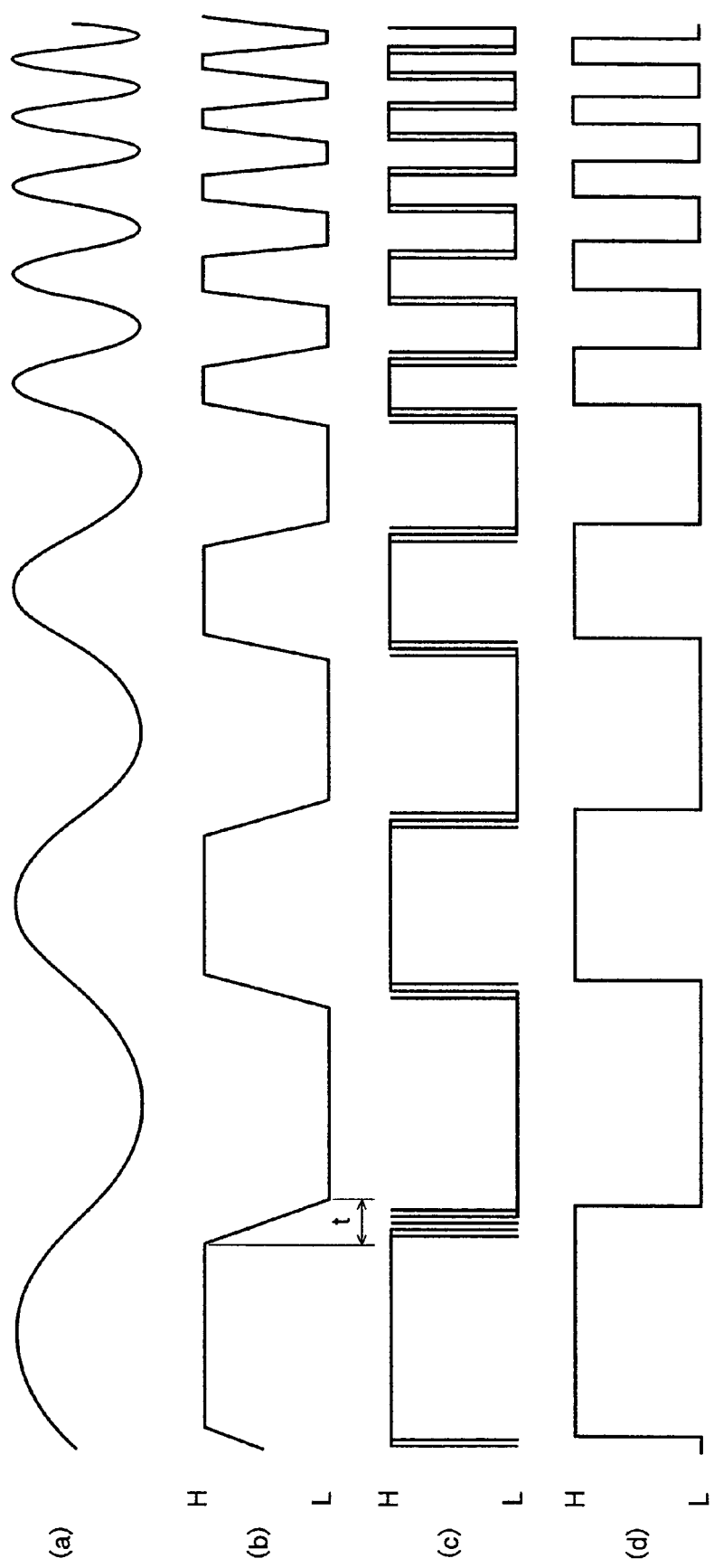
FIG. 5 illustrates in wave form charts output signals of a frequency generator, an amplifier, an input buffer, and a noise reducer, all of which are shown in FIG. 4, for explanation of a noise reduction performed by the noise reducer.

For this reason, where the input signal of the input buffer 205 is not a literal binary signal and therefore takes any level between the above two threshold values, which is to say, where the wave form represented by the input signal of the input buffer 205 has inclined portions thereof, as shown in FIG. 5(*b*), for example, the corresponding output signal of the input buffer 205 fails to be stable.

In this case, the output signal of the input buffer 205 is varied in level depending on various statuses of the voltage of the related power source, the input buffer 205, etc., resulting in local oscillations of the output signal of the input buffer 205, as shown in FIG. 5(*c*), for example.

The local oscillations result from the above inclined portions of the wave form representative of the input signal of the input buffer 205, i.e., the output signal of the amplifier 190. The lower the frequency of the output signal of the FG 150, the longer in time the inclined portions each continue. The local oscillations of the output signal of the input buffer 205 correspond to a noise component which has been incorporated into the frequency signal. The frequency signal is one that originated from the FG 150, and that will enter the noise reducing section 210.

The noise reducing section 210 is provided to reduce the level of a noise component which has been incorporated into the frequency signal received from the input buffer 205. The noise component which is to be reduced in the frequency signal by the noise reducing section 210 is varied in characteristics (e.g., frequency) depending on a set value entering the noise reducing section 210.

The set value modifier 230, as described later in greater detail, is provided to modify the set value. On the other hand, the set value holder 220 is provided to hold the set value set by the set value modifier 230 and to deliver the set value to the noise reducing section 210.

The speed controller 200 further includes a period measuring section 240. The period measuring section 240 measures the period of the frequency signal (corresponding to the rotational speed of the motor 100) from the frequency signal in which the noise component has been reduced by the noise reducing section 210.

The speed controller 200 yet further includes a desired value setting section 250, a comparator 260, a speed computing section 270, and a pulse width modulator 280, all of which are for the feedback control of the rotational speed of the motor 100. Their constructions, as are well-known in the art, will be described below briefly.

The desired value setting section 250 establishes a desired value for the feedback control of the rotational speed of the motor 100. The comparator 260 compares the established desired value and the period measured by the period measuring section 240 with each other, and then outputs a signal representative of the result of the comparison to the speed computing section 270.

Based on the output of the comparator 260 (in the form of digital data), the speed computing section 270 performs a known computing process required for controlling the motor 100 through feedback control such as a PID control (Proportional Integral Derivative Control), resulting in outputting of control data indicative of the instructions to the motor 100. The pulse width modulator 280 modulates the control data received from the speed computing section. 270, in a PWM manner. The LPF 290, once receiving a control signal (in the form of an analog signal) from the pulse width modulator 280, generates an analog voltage signal which is to be actually delivered to the motor driver 300.

The motor driver 300 retrieves the analog voltage signal generated by the LPF 290. The motor driver 300 includes a PWM (pulse width modulated) signal generator 310; a conduction logic circuit 320; an amplifier 330; and a driver 340. Their constructions, as are well-known in the art, will be described below briefly.

The PWM signal generator 310 generates the PWM signal for use in actual control of the rotational motion of the motor 100, by superimposing the retrieved analog voltage signal on a carrier wave signal having a predetermined carrier frequency. The amplifier 330 amplifies the output signals of hall elements 110 (HU), 120 (HV), 130 (HW), all of which are mounted on the motor 100.

The conduction logic circuit 320 determines the amounts of currents to be supplied to coils U, V, W of the motor 100, respectively, based on both the FWM signal retrieved from the PWM signal generator 310 and the three output signals delivered from the amplifier 330 for the respective hall elements 110, 120, 130. The conduction logic circuit 320 then outputs to the driver 340 drive signals indicative of the determined amounts of currents. Based on the drive signal retrieved from the conduction logic circuit 320, the driver 340 supplies drive currents to the coils U, W, W, respectively, whereby the motor 100 is driven.

The frequency signal generated by the FG 150 is a signal smaller in amplitude and lower in frequency during a start up of the motor 100. As the motor 100 is shifting to a regular operation state (i.e., a stable operation state) thereof, the frequency signal increases in amplitude, and increases in frequency depending on the rotational speed of the motor 100.

During a start up of the motor 100, a case may exist where the rotational motion of the motor 100 incorporates therein the noise component resulting from unintended reverse rotations of the motor 100 or the like due to for example backlash of the gear train 6*b* or the like. For this reason, during a start up of the motor 100, the possibility arises that the frequency signal does not always reflect accurately a true one of the components of the compound rotational motion of the motor 100.

With this in mind, in the present embodiment, the noise component is reduced in the frequency signal by means of the noise reducing section 210, allowing the control of the rotational motion of the motor 100 with the rotational state of the motor 100 being accurately monitored.

FIG. 5 exemplifies in wave form charts the output signals of the FG 150, the amplifier 190, the input buffer 205, and the noise reducing section 210, for the sake of the explanation of a noise reduction function provided by the noise reducing section 210.

The wave form of FIG. 5(*a*), as is a representation of an example of the raw frequency signal, shows that the increase in rotational speed of the motor 100 with time occurs with the increase in frequency of the frequency signal. For the sake of simplicity, FIG. 5(*a*) is omitted to illustrate changes in amplitude of the frequency signal according to the rotational speed of the motor 100.

The wave form of FIG. 5(*b*), as is a representation of the output signal of the amplifier 190, shows that, in the present embodiment, as described above, the extremely large amplification factor of the amplifier 190 results in the output signal of the amplifier 190 being approximate to a typical binary signal, while the length of time t during a portion (i.e., the aforementioned inclined portion) of the output signal of the amplifier 190 which changes from high to low level varies depending on the frequency of the frequency signal.

In the present embodiment, as described above, the output signal of the amplifier 190 is converted into the corresponding binary signal by means of the input buffer 205 in preparation for the delivery to the speed controller 200. In the case where the frequency signal entering the amplifier 190 incorporates therein a noise component, as shown in FIG. 5(c), the conversion, i.e., a thresholding operation may cause the output signal of the input buffer, that is, the input signal of the noise reducing section 210 to contain a noise. The noise reducing section 210 performs a noise reduction processing for the input signal of the noise reducing section 210, to thereby generate the signal similar to that of the wave form shown in FIG. 5(d), and to transmit the signal to the period measuring section 240.

Then, the noise reduction processing implemented by the noise reducing section 210 will be described in greater detail.

The noise reduction processing in the present embodiment is implemented to reduce the noise shown in FIG. 5(c), that is, the phenomenon in which the input signal of the noise reducing section 210 oscillates between high and low level.

For implementing the noise reduction processing, the noise reducing section 210 includes an up/down counter in the form of a hard-wired logic circuit. The counter is clocked by a reference clock signal of the system, and selectively performs an incremental and a decremental counting, depending on whether the input signal of the noise reducing section 210 is at high or low level Specifically, the counter's count value ranges from "0" to the same value as the set value held by the set value holder 220. If the input signal of the noise reducing section 210 is at high level, the counter is incremented by a logic one each cycle of the reference clock signal of the system, with its maximum value being equal to the same value as the set value held by the set value holder 220. On the contrary, if the input signal of the noise reducing section 210 is at low level, the counter is decremented by a logic one each cycle of the reference clock signal of the system, with its minimum value being equal to "0."

Once the incremental operation of the counter causes the count value to reach the set value held by the set value holder 220, the output signal of the noise reducing section 210 becomes high in level. On the other hand, once the decremental operation of the counter causes the count value to reach "0," the output signal of the noise reducing section 210 becomes low in level.

Such a processing allows the noise reducing section 210 to function as a low pass filter, to thereby avoid the noise existing in the input signal of the noise reducing section 210 during a high to low change or transition of the input signal, from entering, without being subjected to reduction, the subsequent-stage circuitry including the period measuring section 240.

The relationship between the input and output signals of the noise reducing section 210, that is, the characteristics of the noise component to be reduced by the noise reducing section 210, varies depending on the set value held by the set value holder 220.

Figure 6:
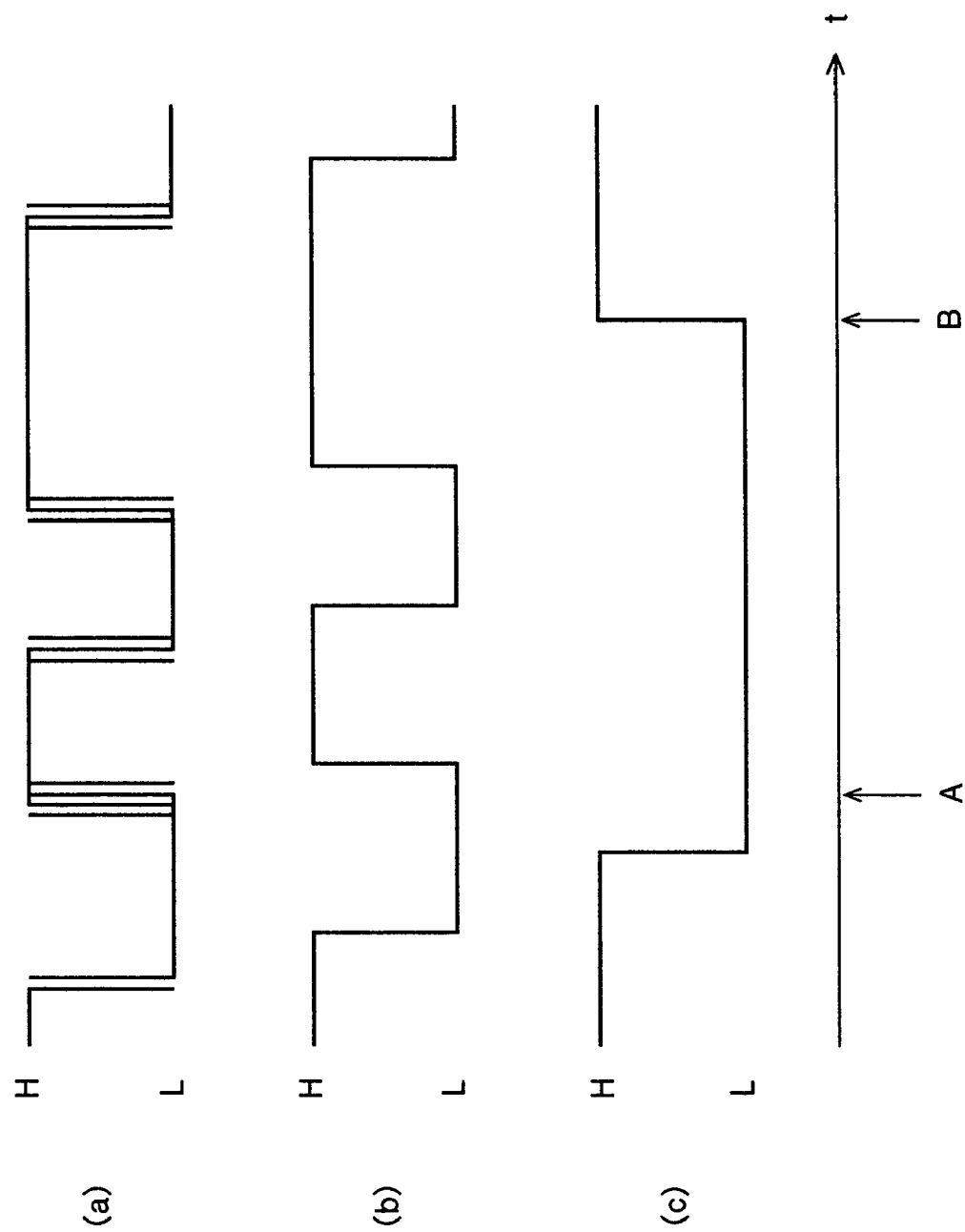
FIG. 6 illustrates in wave form charts an input signal of the noise reducer shown in FIG. 4, and two output signals of the noise reducer which are for explaining variations in output signal of the noise reducer depending on the magnitude of a set value of the noise reducer.

FIG. 6 exemplifies in wave form charts three signals for explaining how the characteristics of the noise to be reduced by the noise reducing section 210 change according to the magnitude of the set value. FIG. 6(a) shows an example of the wave form indicative of the input signal of the noise reducing section 210, FIG. 6(b) shows an example of the wave form indicative of the output signal of the noise reducing section 210 where the set value is smaller, and FIG. 6(c) shows an example of the wave form of the output signal of the noise reducing section 210 where the set value is larger.

As shown in FIG. 6(a), the noise contained in the input signal of the noise reducing section 210 at the time of its high to low change or transition in level, irrespective of whether the set value is smaller or larger, does not immediately appear in the output signal of the noise reducing section 210, as shown in FIGS. 6(b) and 6(c).

However, where the set value is set to be smaller, the output signal of the noise reducing section 210 makes a high to low transition only a little after the input signal of the noise reducing section 210 makes a high to low transition, as shown in FIG. 6(b).

It is added that, a schumitt trigger may be applied as an alternative manner for reducing of such a noise. However, noises due to backlash, etc. may include a kind of noise that the hysteresis of the schumitt trigger fails to cover. It is also added that, in the present embodiment, the adjustment of the set value of the noise reducing section 210 allows a relatively flexible modification of the kind of a reducible noise component. Therefore, although the present invention may be practiced using the schumitt trigger as a noise reduction, the noise reduction processing employed in the present embodiment is also useful.

On the other hand, where the set value is set to be larger, the period of one cycle of the output signal of the noise reducing section 210 becomes longer than that of the input signal as shown in FIG. 6(c). For this reason, a high to low transition of the output signal is made at the point B of time much later than the point A of time at which a high to low transition of the input signal is made, as compared with that of FIG. 6(b). During a period between these points A and B, the noise incorporated into the input signal is reduced, and however, a true one of the frequency components of the composite input signal, in addition to the noise, may be reduced.

What value the set value holder 220 is to hold as the set value, and what value the set value modifier 230 is to modify the initial set value into after a predetermined length of time elapses since the start up of the motor 100 each depend on the frequency of the binary signal into which the frequency signal has been converted, the frequency of a true one of the frequency components of the composite frequency signal, etc.

It is preferable that the set value is set such that a targeted component of the input signal of the noise reducing section 210 that is required for detecting the true one of the components of the composite rotational motion of the motor 100 is not reduced but passed through the noise reducing section 210, while a high-frequency noise component of the same input signal is reduced, especially during the start up of the motor 100, and such that the rotational state represented by the resulting output signal of the noise reducing section 210 is not excessively different from the corresponding actual rotational state of the motor 100.

The set value held by the set value holder 220 may be set such that the set value remains unchanged, irrespective of whether it is during or after the start up of the motor 100, during the operation of the laser printer. Alternatively, the set value may be set so as to vary with time depending on whether it is during or after the start up of the motor 100.

The modification of the set value is made by the set value modifier 230. In this case, the set value modifier 230 may be operated by a computer. The set value modifier 230 may be configured, for example, so as to set the set value to a larger value during the start up of the motor 100, and to modify the initial set value into a smaller value after a predetermined length of time elapses from the start up of the motor 100.

The signal in which the noise component has been reduced by the noise reducing section 210 enters in the form of a digital signal (an example of the signal of the rotational state) the period measuring section 240. The period measuring section 240 measures the period of each on/off cycle of the digital signal entered, and outputs to the comparator 260 the measured period in the form of digital data having a predetermined bit number (8 or 16 bits, for example).

The comparator 260 compares a value represented by the digital data (which reflects the rotational speed of the motor 100) received from the period measuring section 240 with the desired value set by the desired value setting section 250, resulting in the delivery of the data indicative of the result of the comparison to the speed computing section 270.

The speed computing section 270 refers to the result of the comparison between the rotational speed of the motor 100 detected by the period measuring section 240 and the desired value, to thereby generate control data indicative of the instructions to the motor 100 required for the control of the motor 100 using a known control manner such as a PID control, for example.

The bit number of the control data may be determined as desired according to the frequency of the reference clock of the system, for example. The control data may therefore be generated in the form of digital data 16 bits, 32 bits, or 64 bits long, for example. The generated control data, upon delivered to the pulse width modulator 280, is modulated into a pulse width modulated signal (PWM signal) by the pulse width modulator 280.

As is evident from the above explanation, the motor control device in accordance with the present embodiment, by virtue of the noise reducing section 210 reducing the noise component appearing in the binary signal delivered to the speed controller 200, permits the feedback control of the motor 100 with the use of the frequency signal representative of the rotational state of the motor 100, even during the start up of the motor 100, with the rotational state of the motor 100 being accurately monitored.

In other words, the above motor control device permits the feedback control of the motor 100 with the use of the frequency signal representative of the rotational state of the motor 100, irrespective of whether or not the start up of the motor is being experienced.

As will be readily understood from the above explanation, in the present embodiment, the FG 150 constitutes an example of the "signal generator" set forth in the above mode (1), and the amplifier 190, the input buffer 205, the speed controller 200, the LPF 290, and the motor driver 300 cooperate with each other to constitute an example of the "controller" set forth in the same mode.

Further, in the present embodiment, the noise reducing section 210, the set value holder 220, and the set value modifier 230 cooperate with each other to constitute an example of the "noise reducer" set forth in the above mode (3), the period measuring section 240, the desired value setting section 250, the comparator 260, the speed computing section 270, and the pulse width modulator 280 cooperate with each other to constitute an example of the "control-signal producing device" set forth in the same mode.

Yet further, in the present embodiment, the scanner unit 2, the process unit 3, and the fuser unit 4 cooperate with each other to constitute an example of the "image forming device" set forth in the above mode (16), the feeder unit 5 constitutes an example of the "feeding device" set forth in the same mode, the main motor 6a and the scanner motor 86 cooperate with each other to constitute an example of the "at least one motor" set forth in the same mode, and the FG 150, the amplifier 190, the input buffer 205, the speed controller 200, the LPF 290, and the motor driver 300 cooperate with each other to constitute an example of the "driving device" set forth in the same mode.

Then, with reference to FIGS. 7–9, a second embodiment of the present invention will be described. However, in the present embodiment, there are many elements common to the first embodiment. In view of the above, the common elements of the present embodiment to those of the first embodiment will be referenced the same names or the same reference numerals as those in the description and illustration of the first embodiment, without a redundant description and illustration, while the different elements of the present embodiment from those of the first embodiment will be described in more detail.

In the first embodiment, the rotational state of the motor 100 is detected with the use of the frequency signal outputted from the FG 150 provided for the motor 100. On the other hand, in the present embodiment, the rotational state of the scanner motor 86 rotating the polygon mirror 20 is detected with the use of a signal outputted from a beam detector detecting the laser beam emitted from the polygon mirror 20.

Figure 7:
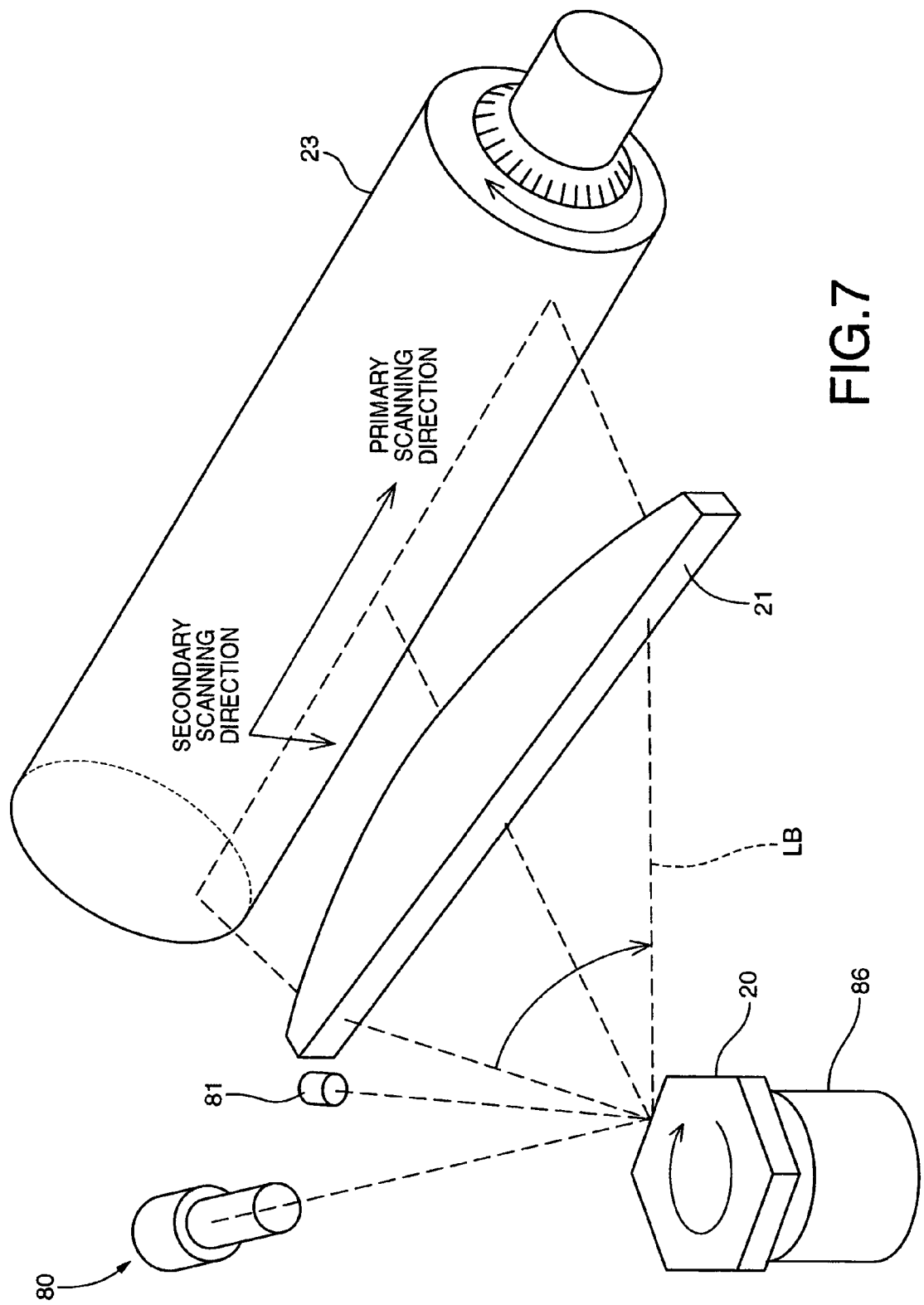
FIG. 7 is a perspective view illustrating a laser optical system of a laser printer according to a second embodiment of the present invention.

FIG. 7 shows in perspective view an exposure section of the laser printer including a motor control device in accordance with the present embodiment. In the exposure section, a light source 80 including a semiconductor laser, etc. emits the laser beam (denoted by "LB" in FIG. 7) which is deflected by the polygon mirror 20 driven for rotation by the scanner motor 86. The deflected laser beam passes through an f θ lens 21 into the surface of the photosensitive drum 23, whereby the photosensitive drum 23 is cyclically scanned with and exposed to the laser beam in the primary scanning direction.

As shown in FIG. 7, in the laser printer, a beam detector (hereinafter, referred to simply as "BD") 81 is disposed stationary at a predetermined position for allowing the laser beam to enter the BD 81, each cycle of scanning of the laser beam immediately prior to the start point of a corresponding cycle of scanning of the photosensitive drum 23. The BD 81 outputs a detector signal varied in level depending on whether or not the BD 81 receives the laser beam. The detector signal, as shown in FIG. 9(a), becomes an off-state signal (a non-light-reception signal) in a state in which the BD 81 does not receive the laser beam, while the detector signal becomes an on-state signal (a light-reception signal) in a state in which the BD 81 receives the light beam.

Figure 8:
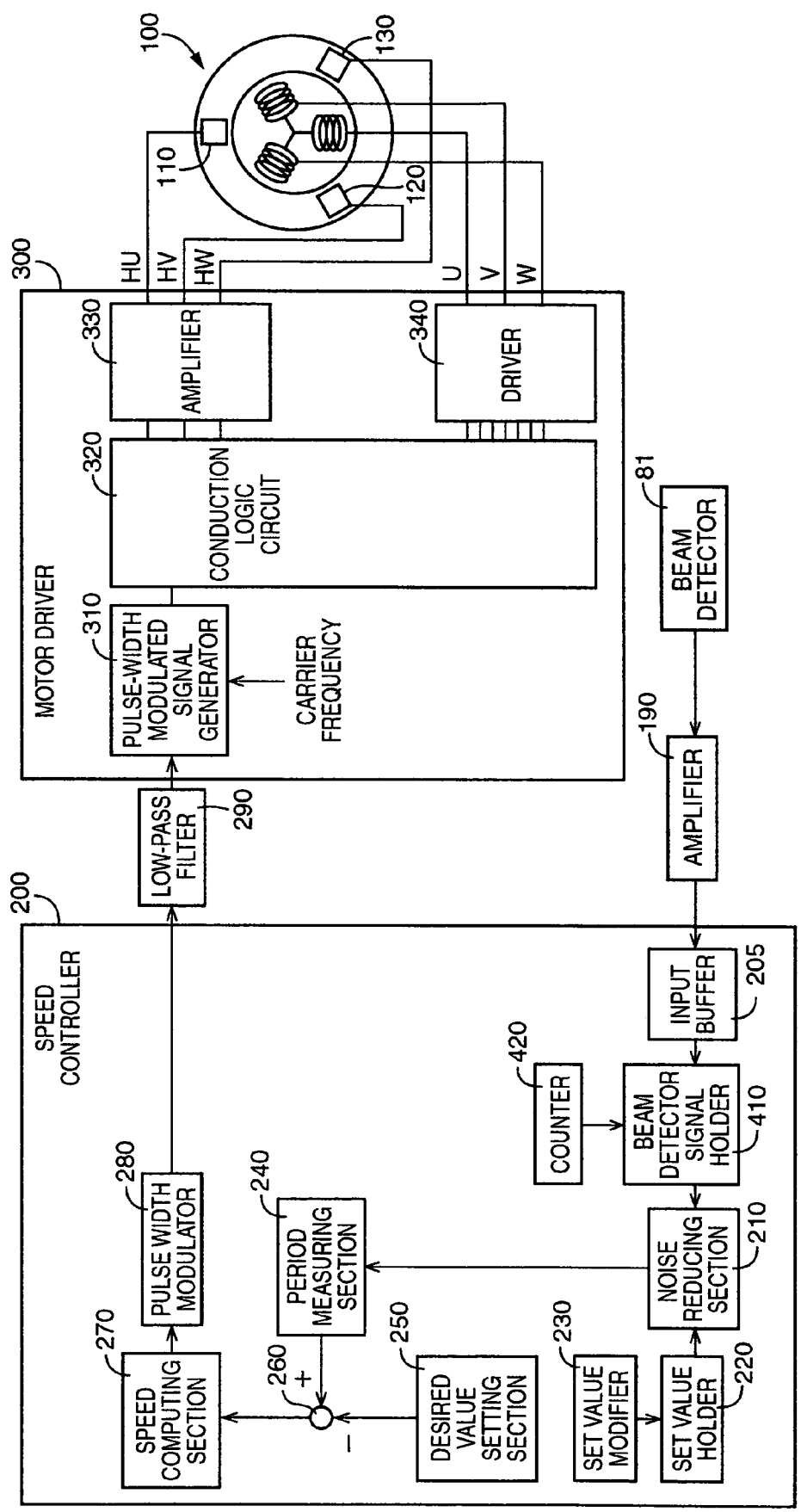
FIG. 8 is a schematic view illustrating a motor control device in the laser printer shown in FIG. 7.

FIG. 8 shows in block diagram an example of a motor control device of the present embodiment in a similar manner to FIG. 4. For explaining a noise reduction processing of the motor control device, FIG. 9 shows several signals in wave form charts. FIG. 9(a) shows a wave form of the BD signal, which is outputted from the BD 81 and which becomes an on-state signal at the point of time at which the laser beam enters the BD 81.

Because of the fast passing of the laser beam through the BD 81 during the scanning, the BD signal, even after becoming on-state accordingly, remains the same in state only for very short period, as shown in FIG. 9(a).

For this reason, if the noise reducing section 210 in the present embodiment implements the noise reduction processing in the same manner as that in the first embodiment without any additional processing, it may possibly cause the output signal of the noise reducing section 210 to show no temporal change and eventually no reflection of actual changes in the BD signal.

In view of the above, in the present embodiment, the BD signal is processed, such that, once the state of the unprocessed or raw BD signal is changed from an off-state to an on-state, the state of the processed BD signal, upon changed from an off-state to an on-state, is retained to be an on-state even after the unprocessed BD signal is returned to an off-state, to thereby prolong a period during which the state of the processed BD signal is an on-state. This pre-processing secures the subsequent noise reduction processing for the BD signal.

As shown in FIG. 8, the speed controller 200 in the present embodiment includes a BD signal holder 410 and a counter 420, in addition to the same component as those of the speed controller 200 shown in FIG. 4.

In the BD signal holder 410, if the BD signal changes from an off-state to an on-state at the point A of time as shown in FIG. 9(a), the output signal of the BD signal holder 410 changes from an off-state to an on-state as shown in FIG. 9(b) as well. In the BD signal holder 410, even after the BD signal returns to an off-state, the output signal of the BD signal holder 410 is retained to be an on-state for a period as long as possible. As a result, a period during which a signal is retained to be an on-state (hereinafter, referred to as "on-state period") becomes longer with the output signal of the BD signal holder 410 than with the raw BD signal.

Figure 9:
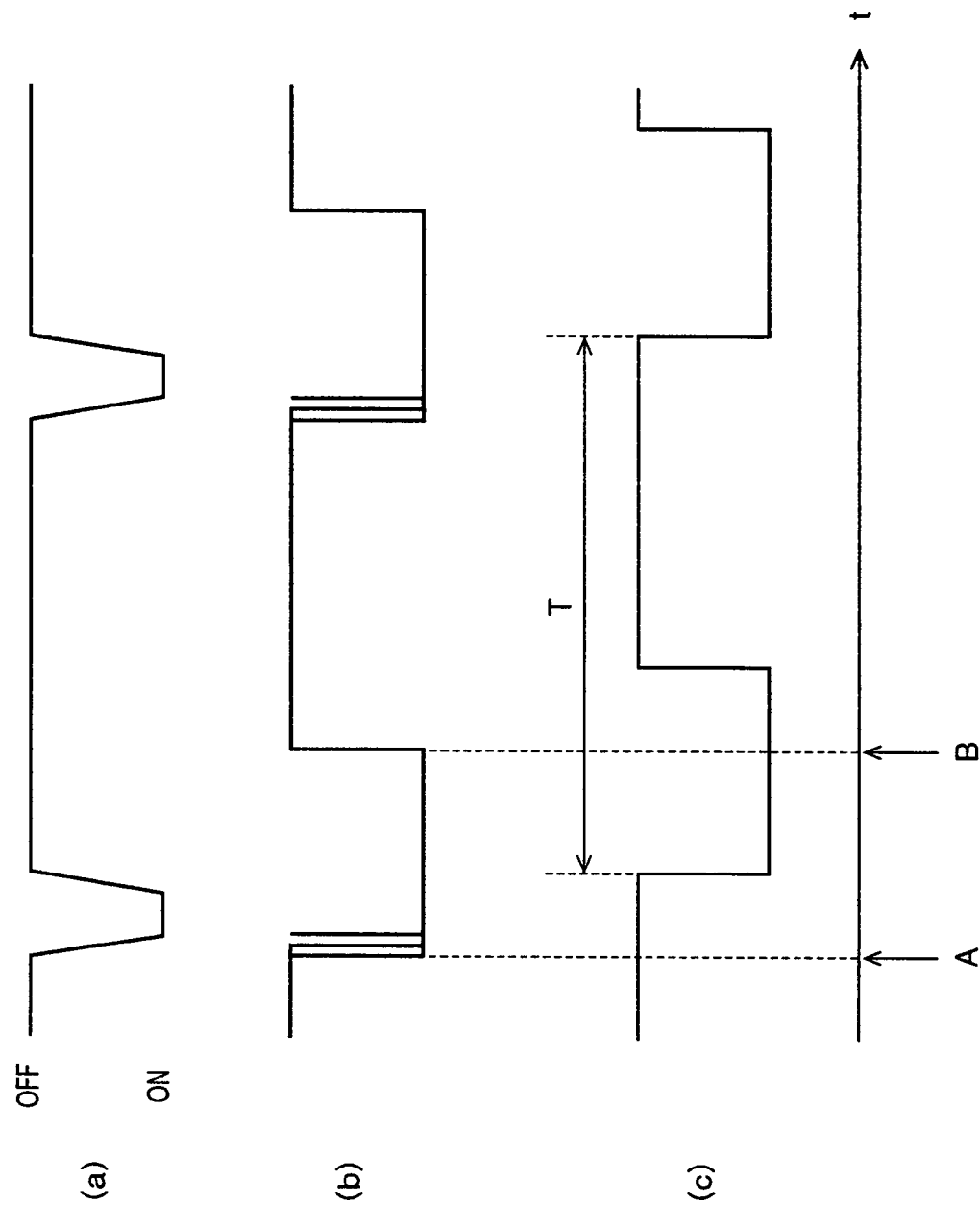
FIG. 9 illustrates in wave form charts output signals of a beam detector, a detector-signal holder, and a noise reducer, all of which are shown in FIG. 8.

More specifically, the BD signal holder 410 is operated, for prolonging the on-state period of its output signal, such that, for example, once the BD signal becomes an on-state, the BD signal is latched, to thereby hold the output signal of the BD signal holder 410 to be an on-state until the counter 420 times-up, i.e., until the point B of time is reached as shown in FIG. 9.

As shown in FIG. 8, the output signal of the ED signal holder 410 then enters the noise reducing section 210 implementing the noise reduction processing in the same manner as that of the first embodiment. As a result, as shown in FIG. 9(c), the reduction of a noise component of the output signal of the noise reducing section 210 is performed in the vicinity of the point A of time.

As is evident from the above explanation, in the present embodiment, the BD 81 constitutes an example of the "signal generator" set forth in the above mode (1), and the amplifier 190, the input buffer 205, the speed controller 200, the LPF 290, and the motor driver 300 cooperate with each other to constitute an example of the "controller" set forth in the same mode.

Further, in the present embodiment, the noise reducing section 210, the set value holder 220, the set value modifier 230, the BD signal holder 410, and the counter 420 cooperate with each other to constitute an example of the "noise reducer" set forth in the above mode (3), the period measuring section 240, the desired value setting section 250, the comparator 260, the speed computing section 270, and the pulse width modulator 280 cooperate with each other to constitute an example of the "control-signal producing device" set forth in the same mode.

Yet further, in the present embodiment, the BD signal holder 410 and the counter 420 cooperate with each other to constitute an example of the "signal processor" set forth in the above mode (15), the noise reducing section 210, the set value holder 220, and the set value modifier 230 cooperate with each other to constitute an example of the "noise reducing device" set forth in the same mode, and the period measuring section 240, the desired value setting section 250, the comparator 260, the speed computing section 270, and the pulse width modulator 280 cooperate with each other to constitute an example of the "control-signal producing device" set forth in the same mode.

It is added that, although the noise reducing section 210 introduces a time delay of a transition point of time at which the output signal of the noise reducing section 210 changes between an off-state and an on-state, relative to a transition point of time at which the BD signal changes between an off-state and an on-state, the period T of the output signal of the noise reducing section 210 approximately coincides with that of the BD signal.

In addition, for securing the speed control of the scanner motor 86, accuracy in measuring the period T of the output signal of the noise reducing section 210 is important to be achieved. For this reason, the above time delay of the transition point of the output signal of the noise reducing section 210 can be ignored without causing any practical problem.

Then, a third embodiment of the present invention will be described. However, in the present embodiment, there are many elements common to those of the first and second embodiments. In view of this, the common elements of the present embodiment will be referenced the same names or the same reference numerals as those in the description and illustration of the first and second embodiments, without a redundant description and illustration, while the different elements of the present embodiment from those of the first and second embodiments will be described in more detail.

The first and second embodiments are each constructed, as described above, such that the noise reducing section 210 delays the transition point of the output signal of the noise reducing section 210 until the sum of lengths in time of durations, during each of which the input signal of the noise reducing section 210 is held at a selected one of a high level and a low level reaches a length of time corresponding to the above-described set value, to thereby implement the noise reduction processing for the frequency signal of the FG 150 and the BD signal of the BD 81.

On the other hand, where the frequency signal of the FG 150 is employed for controlling the motor 100, there is a characteristic that the frequency signal is smaller in amplitude during a start up of the motor 100 and that the frequency signal increases in amplitude as the motor 100 is shifting from a start-up or transient state to a regular or steady rotational state.

By the use of the above characteristic, the noise reduction can be provided by temporally changing the characteristic of the amplitude 190 without requiring such a processing as the noise reducing section 210 implements.

With this in mind, in the present embodiment, the amplifier 190 is in the form of an amplifier (antilogarithmic amplifier, for example) which amplifies an input signal thereof by a variable amplification factor, wherein the amplification factor is established to become smaller during a period with the input signal smaller in amplitude, and become larger during a period with the input signal larger in amplitude. The amplifier 190 provides the noise reduction during a start up of the motor 100.

In the present embodiment, the noise reducing section 210, while may be removed from the speed controller 200, may of course be included therein.

As is evident from the above explanation, in the present embodiment, the amplifier 190 constitutes an example of the "amplifier" set forth in the above mode (8) or (9).

Then, a forth embodiment of the present invention will be described below. However, in the present embodiment, there are many elements common to those of the third embodiment. In view of the above, the common elements of the present embodiment will be referenced the same names or the same reference numerals as those in the description and illustration of the third embodiment, without a redundant description and illustration, while the different elements of the present embodiment from those of the third embodiment will be described in more detail.

In the present embodiment, the amplifier 190 is in the form of an amplifier variable in state between an operative state and an inoperative state. The amplifier 190 is set to be placed in an inoperative state during a start up of the motor 100 for preventing amplification of an input signal of the amplifier 190. Owing to this setting, the amplifier 190 provides the noise reduction during a start up of the motor 100.

In the present embodiment, the noise reducing section 210, while may be removed from the speed controller 200, may of course be included therein.

As is evident from the above explanation, in the present embodiment, the amplifier 190 constitutes an example of the "amplifier" set forth in the above mode (7).

Although the several embodiments of the present invention have been described above, the present invention is of course not limited to the specific details and representative embodiments shown and described herein. Accordingly, for example, various modifications may be made without departing from the spirit or scope of the present invention.

For example, in the first to fourth embodiments, the noise reducing section 210 is constructed, such that the counter thereof performs a counting operation, in response to each change in level of the input signal of the noise reducing section 210, in a corresponding one of counting directions (for incremental (up) and decremental (down) counting operations, respectively) to an actual one of transition directions of the input signal (high-to-low direction and low-to-high direction).

The noise reducing section 210 is further constituted, such that the output signal of the noise reducing section 210 is fixed in level until the count value of the counter reaches the set value, and such that the output signal is allowed to change in level after the count value of the counter exceeds the set value.

Additionally or alternatively to the noise reducing section 210, a digital filter such as a well-known FIR (finite-duration impulse response)-type or IIR (infinite-duration impulse response)-type may be employed so as to temporally change the filter factor of the digital filter for achieving noise reduction similar to that of the noise reducing section 210, to practice the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for controlling a rotational motion of a motor, comprising:
    a signal generator generating a rotational state signal indicative of a rotational state of the motor; and
    a controller producing a control signal for controlling the rotational motion of the motor, based on the rotational state signal generated by the signal generator, to thereby control the motor based on the produced control signal,
    wherein the controller produces the control signal during a start up of the motor, based on the rotational state signal generated by the signal generator, such that the produced control signal is resistant to a noise component which is incorporated into the rotational state signal during the start up of the motor.

2. The apparatus according to claim 1, wherein the controller produces the control signal for controlling the rotational motion of the motor through feedback control based on the generated rotational state signal, irrespective of whether it is during or after the start up of the motor.

3. The apparatus according to claim 1, wherein the controller comprises: a noise reducer reducing a level of the noise component in the rotational state signal generated by the signal generator; and a control-signal producing device producing the control signal based on the rotational state signal in which the noise component has been reduced by the noise reducer.

4. The apparatus according to claim 3, wherein the noise reducer reduces the level of the noise component in the rotational state signal, prior to the production of the control signal based on the rotational state signal.

5. The apparatus according to claim 3, wherein the noise reducer is configured such that a noise component to be reduced in level in the rotational state signal is varied in characteristics depending on a set value, and wherein the set value is varied between during and after the start up of the motor.

6. The apparatus according to claim 5, wherein the set value is established in magnitude to allow the noise reducer not to reduce the level of a frequency component of the rotational state signal which reflects a true component of compound rotational motion of the motor during the start up of the motor.

7. The apparatus according to claim 3, wherein the noise reducer comprises an amplifier amplifying the rotational state signal, wherein the amplifier is configured to become substantially inoperative during the start up of the motor.

8. The apparatus according to claim 3, wherein the noise reducer comprises an amplifier amplifying the rotational state signal by a variable amplification factor, wherein the amplification factor is established to become smaller during the start up of the motor, and become larger during a steady motion of the motor.

9. The apparatus according to claim 8, wherein the amplifier is an antilogarithmic amplifier.

10. The apparatus according to claim 1, wherein the signal generator comprises a frequency generator outputs the rotational state signal in the form of a frequency signal which is an analog signal varied in frequency depending upon the rotational state of the motor.

11. The apparatus according to claim 10, wherein the frequency signal is varied in frequency depending upon a rotational speed of the motor.

12. The apparatus according to claim 10, wherein the controller comprises a noise reducing device reducing in level the noise component in a signal obtained by amplifying the frequency signal generated by the frequency generator.

13. The apparatus according to claim 1, wherein the controller reduces the noise component in the rotational state signal according to a noise reduction rule varying between during and after the start up of the motor, and producing the control signal, based on the rotational state signal reduced in noise level.

14. A method of controlling a rotational motion of a motor, comprising the steps of:
    generating a rotational state signal indicative of a rotational state of the motor;
    reducing within the generated rotational state signal a level of a noise component which is incorporated into the rotational state signal during a start up of the motor;

producing a control signal for controlling the rotational motion of the motor through feedback control, based on the rotational state signal in which the noise component has been reduced in level, irrespective of whether it is during or after the start up of the motor; and controlling the motor based on the produced control signal.

15. An apparatus for controlling a rotational motion of a motor, comprising:

a signal generator generating a rotational state signal indicative of a rotational state of the motor; and a controller producing a control signal for controlling the rotational motion of the motor, based on the rotational state signal generated by the signal generator, to thereby control the motor based on the produced control signal, wherein the controller produces the control signal during a start up of the motor, based on the rotational state signal generated by the signal generator, such that the produced control signal is resistant to a noise component which is incorporated into the rotational state signal during the start up of the motor, wherein the motor comprises a scanner motor rotating a polygon mirror for use in scanning a light beam cyclically, wherein the signal generator comprises a beam detector disposed stationary at a predetermined position allowing the light beam to enter the beam detector intermittently per each cycle of scanning of the light beam, the beam detector outputting a detector signal varied in level depending on whether or not the beam detector receives the light beam, and wherein the rotational state signal is the detector signal outputted from the beam detector.

16. The apparatus according to claim 15, wherein the polygon mirror deflects the light beam cyclically to scan a photoconductor.

17. The apparatus according to claim 15, wherein the controller comprises:

a signal processor processing the detector signal outputted from the beam detector;

a noise reducing device reducing the noise component in the detector signal processed by the signal processor; and a control-signal producing device producing the control signal based on the detector signal in which the noise component has been reduced by the noise reducing device, wherein the signal processor processes unprocessed detector signal into processed detector signal in a manner that, in a steady state of the unprocessed detector signal, the processed detector signal indicates whether the unprocessed detector signal is a non-light-reception signal indicating that the beam detector does not receive the light beam, or a light-reception signal indicating that the beam detector receives the light beam, and wherein the signal processor processes the unprocessed detector signal into the processed detector signal in a manner that, in an oscillating state in which the unprocessed detector signal is oscillated in level so as to alternately repeat a forward transition of the unprocessed detector signal from the non-light-reception signal to the light-reception signal, and a reverse transition from the light-reception signal to the non-light-reception signal, the processed detector signal steadily indicates the forward transition, without indicating the reverse transition, during a predetermined length of time elapsed from a start time of the forward transition.

18. An apparatus for forming an image, comprising:

an image forming device forming an image on an image receiver medium;

a feeding device feeding the image receiver medium to the image forming device;

at least one motor for use in at least one of the image forming device and the feeding device; and a driving device driving the at least one motor for rotation thereof, wherein the driving device comprises an apparatus for controlling a rotational motion of at least one of the at least one motor, and wherein the apparatus includes:

a signal generator generating a rotational state signal indicative of a rotational state of the motor; and a controller producing a control signal for controlling the rotational motion of the motor, based on the rotational state signal generated by the signal generator, to thereby control the motor based on the produced control signal, wherein the controller produces the control signal during a start up of the motor, based on the rotational state signal generated by the signal generator, such that the produced control signal is resistant to a noise component which is incorporated into the rotational state signal during the start up of the motor.

19. An apparatus for controlling a rotational motion of a motor, comprising:

a signal generator generating a rotational state signal indicative of a rotational state of the motor;

a noise reducer reducing within the generated rotational state signal a level of a noise component which is incorporated into the rotational state signal during a start up of the motor; and a controller producing a control signal for controlling the rotational motion of the motor through feedback control, based on the rotational state signal in which the noise component has been reduced in level, irrespective of whether an operation state of the motor is during or after the start up of the motor, and controlling the motor based on the produced control signal.

20. A method of controlling a rotational motion of a motor, comprising the steps of:

generating a rotational state signal indicative of a rotational state of the motor;

reducing a level of a noise component which is incorporated into the rotational state signal, according to a noise reduction rule varying between during and after a start up of the motor;

producing a control signal for controlling the rotational motion of the motor, based on the rotational state signal reduced in noise level, to thereby control the motor based on the produced control signal; and controlling the motor based on the produced control signal.

* * * * *